UNITED STATES PATENT OFFICE.

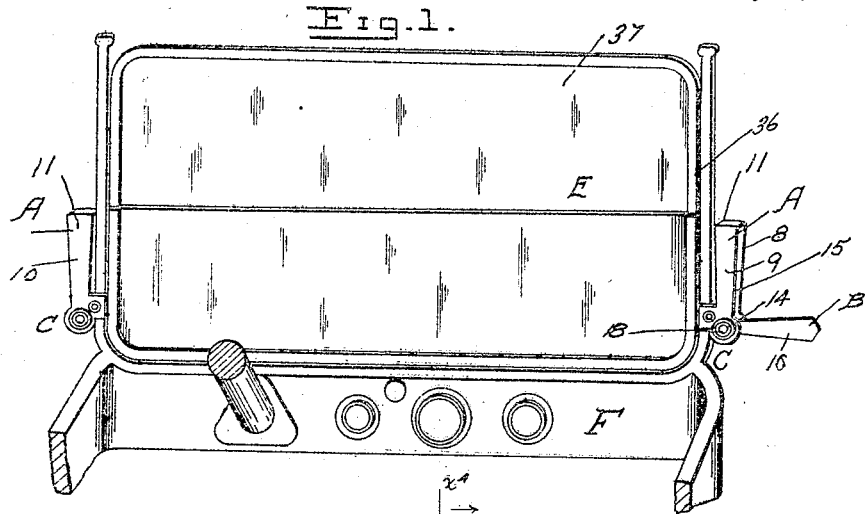
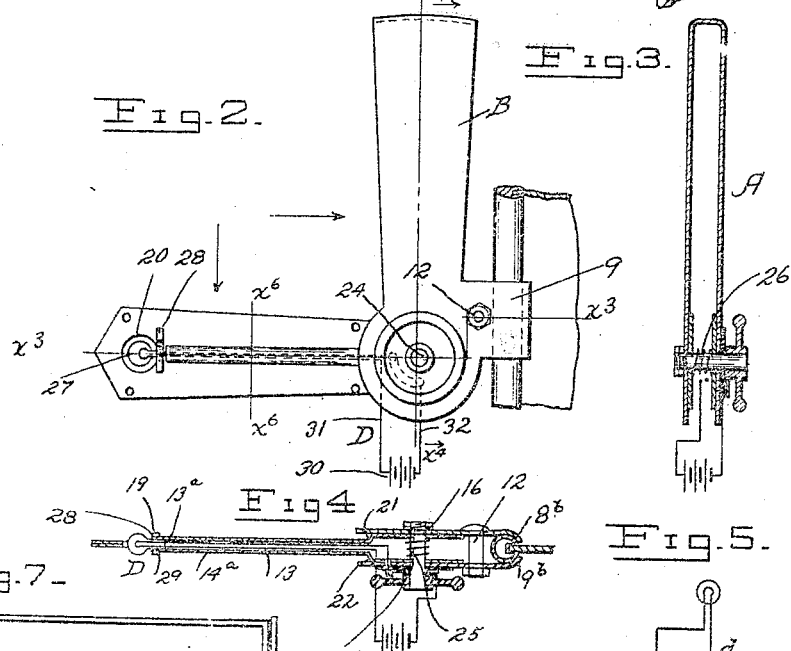
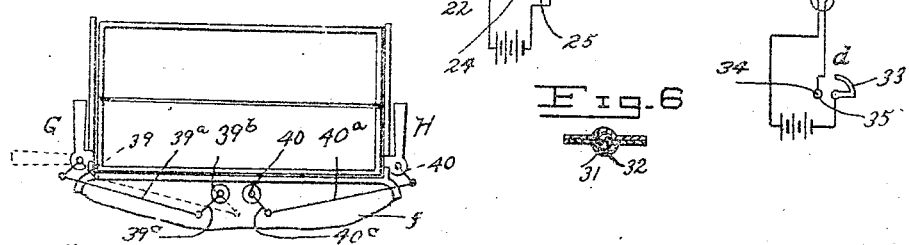

ALBERT LEE ELIEL, OF LOS ANGELES, CALIFORNIA, ASSIGNOR OF ONE-HALF TO ANGUS W. McDONELL, OF LOS ANGELES, CALIFORNIA.

VEHICLE-SIGNAL.

1,266,004. Specification of Letters Patent. Patented May 14, 1918.

Application filed December 1, 1916. Serial No. 134,420.

*To all whom it may concern:*

Be it known that I, ALBERT LEE ELIEL, a citizen of the United States, residing at Los Angeles, in the county of Los Angeles and State of California, have invented new and useful Improvements in Vehicle-Signals, of which the following is a specification.

This invention relates to vehicle signals, and it has for its object to provide an improved signal for motor vehicles and the like which may be set by the driver or operator of the same to indicate the immediate future course of the vehicle, to the end that drivers of approaching or following vehicles or pedestrians may take proper notice before the vehicle equipped with signals is turned to the left or right.

In accordance with the invention, a movable signal member and a housing therefor are provided, the movable member being arranged for oscillation by the driver to project the same at the side of the vehicle or return the same to its housing. Preferably two units are provided, one located at each side of the vehicle at the forward portion thereof, as for instance by mounting the same upon a wind shield, and one at each side edge thereof so that if the vehicle is to be turned to the left, the left hand oscillatory signal member may be displayed as projecting from the left hand side of the vehicle, and if the vehicle is to be turned to the right the right hand signal member is so projected while the left hand signal member is allowed to remain in its housing or other retracted position. Means are provided for operating the signal member of each unit, and such means may in each instance comprise a suitable hand wheel or grip mounted upon a shaft to which the movable signal member is secured, and whereby the driver may cause the projection of the respective signal member at the side of the vehicle or return the same to its retracted position. The invention further contemplates the provision of lighting means for the signal member or members and such lighting means may comprise an electric lamp mounted on and carried by the signal, a source of electrical energy supply, switch means whereby the flow of electrical energy to the lamp is automatically permitted when the signal member is displayed or projected and whereby such supply of electrical energy will be automatically cut off upon movement of the signal member toward its housing. The housing is preferably provided with means whereby such housing and its contained signal member may be conveniently attached to the frame edge of a wind shield or to other portions of the vehicle.

A further object of the invention is to provide signaling means of the general character stated, which will be relatively simple and inexpensive in construction and organization when such advantages as positiveness in operation and facility in control and freedom from liability to get out of order or repair are considered.

With the above and other objects in view the invention consists in the novel and useful provision, formation, construction, combination, association, and relative arrangement of parts, members and features, all as hereinafter described, shown in the drawing and finally pointed out in the claims.

In the drawing:

Figure 1 is a fragmentary isometric view of the dash of a motor vehicle and the wind shield thereof showing a pair of signals constructed and organized in accordance with the invention as mounted on the wind shield in position for service and within convenient reach of the operator of the vehicle;

Fig. 2 is an enlarged rear elevation of a signal such as shown in Fig. 1, the oscillatory signaling member thereof being shown as in projected or extended position, a fragment of the windshield of the vehicle being shown;

Fig. 3 is a vertical sectional view taken on the line $x^3$—$x^3$, Fig. 2, and looking in the direction of the appended arrows;

Fig. 4 is a horizontal sectional view taken on the line $x^4$—$x^4$, Fig. 2, and looking in the direction of the appended arrows;

Fig. 5 is a diagrammatic showing of electrical features of the improved signal;

Fig. 6 is a transverse sectional view taken on line $x^6$—$x^6$, Fig. 2; and

Fig. 7 is a fragmentary inner face view of the dash of the motor vehicle and the wind shield thereof showing diagrammatically a modified form of controlling means for the signals, one of which is indicated at each side of the wind shield.

The parts in the several figures are designated by reference characters.

In the form of the invention shown in Figs. 1 to 6, inclusive, each of the improved signals is shown as comprising a housing, A, a movable signaling member B, operating means C for the movable signal member B, and lighting means D.

As the signals are organized substantially alike, except that they are "lefts and rights," the description of one of such signals will serve as a description of both.

The casing or housing A consists of a preferably metallic box-like structure having a front wall 8, a rear wall 9, an inner edge wall 10, and a top or end wall 11, and such box-like structure is provided with means $c$ whereby the same may readily be attached to the vehicle.

The means $c$ is shown as comprising an inwardly ranging extension $8^a$ of the wall 8, an inwardly ranging extension $9^a$ of wall 9, and a nut and bolt device 12. The extensions $8^a$ and $9^a$ are curved inwardly as at $8^b$ and $9^b$ respectively, to properly clamp wind shield features, and the bolt is passed through suitable orifices in the extensions $8^a$ and $9^a$, the nut serving to draw the extensions into wind shield clamping position.

The movable signaling member B consists of a blade 13 mounted on a shaft 14 and normally disposed in the housing A and adapted for projection therefrom through the outer open edge of the housing indicated at 15, Fig. 1. This shaft 14 is journaled in the front wall 8 as at 16 and in the rear wall 9 as at 17, and such shaft projects rearwardly through the wall 9 where it is provided with a hand grip 18 constituting the operating means C. The blade 13 is preferably formed of a pair of matched sheet metal members $13^a$ and $14^a$ riveted together at the outer end as at 19, and such members $13^a$ and $14^a$ are provided with registering apertures near the outer ends thereof as at 20 and with longitudinal grooves formed by pressing the metal of the members $13^a$ and $14^a$ outwardly thus forming a conduit for electrical circuit wires in the blade, such conduit extending from the aperture at 20 to a point inwardly of the casing or housing A where the blade portions $13^a$ and $14^a$ diverge as at 21 and 22, respectively, such blades inwardly of the point of divergence lying in flat facial contact with the inner surfaces of the walls 8 and 9, respectively. The parallel inner portions of the blade portions $13^a$ and $14^a$ are apertured to accommodate the shaft 14 as at 23 and 24, respectively, and the shaft 14 is provided with a key-way 25, the blade portions being formed at the aperture to fit the shaft and extend into the key-way. A coil compression spring 26 is disposed between the separated blade portions and surrounds the shaft 14, insuring frictional contact as between the blade portions and the inner surfaces of the walls 8 and 9 of the housing.

The means D is shown as comprising an electric lamp 27 disposed in the aperture provided in the blade at 20 and secured to the blade by clips 28 and 29 applied to the blade at opposite sides thereof and serving to properly support the lamp, a source of electrical energy supply shown as a battery 30, switch means $d$, and circuit wires 31 and 32. The battery may be conveniently located in the vehicle and may serve in addition to furnishing energy to light the electric lamp 27, as an electrical energy supply for other vehicle features or devices, or such battery may have substituted therefor other suitable electrical supply means. The switch means $d$ may comprise a spring segment or quadrant 33, and a contact 34 mounted in the wall 9 of the casing A and extending through such wall, insulating means 35 being provided to support the contact 34. The segment 33 may be a spring, and is mounted upon the shaft 14 for rotation therewith. The circuit wires are preferably arranged so that the same are in part housed in the conduit provided in the switch blade and one of such circuit wires extends from the contact 34 to the lamp 27, the other of the circuit wires extending from the lamp, through the conduit, to the battery which the wire is interrupted to receive, and from the battery to the segment 33 on the shaft 14. The segment 33 is arranged to sweep over the contact 34 when the signaling member or blade 13 is in extended position.

The wind shield of a motor vehicle is shown at E and the dash of the vehicle is shown at F. The wind shield E is shown as comprising a frame 36 and a glass 37, the side edge portions of the frame being clamped between the curved extensions $8^b$ and $9^b$, which with the bolt and nut device 12 constitute the means $c$.

In the modified form of controlling or operating means shown in Fig. 7 a signal is shown at G at the left hand side of the vehicle and a further signal is shown at H at the right hand side of the vehicle, the signals being organized as are the signals just described but with the hand grips 18 omitted. The hand grips 18 are, in this form of construction, replaced by arms 39 and 40 and such arms may be operated through links $39^a$ and $40^a$, respectively, by means of their respective hand grips $39^b$ and $40^b$ which are rotatably mounted on the dash shown at $f$, the link 39 being connected at its inner end with a laterally extending arm $39^c$ provided in association with the hand grip $39^b$. The link 48 is connected at its inner end with an arm $40^c$ provided in association with the hand grip $40^b$.

The operation, method of use, and advantages of the invention will be readily understood from the foregoing description, taken in connection with the accompanying drawing and the following statement:

The driver of a vehicle equipped with signals as illustrated in Figs. 1 to 6, inclusive, may by turning the grip 18 of either the right or left hand signal swing the respective blade 13 out of its housing A and horizontally display the same. After the turn has been made by the vehicle, in the direction indicated by the signal so set, the driver or operator of the vehicle may by reversely turning the hand grip 18 rotate the shaft 14 and return the blade 13 of the signal to its housing, the blade being retained in vertical position in its housing due to the friction between the inner ends of the switch blade portions in riding over the inner surfaces of the walls 8 and 9, the spring 26 being of the proper tension to provide the desired or proper resistance to blade movement. In the setting of a signal in its extended position, the segment 33 will contact with the electrical contact 34 and the electrical circuit from the battery to the lamp will be closed while the signal is set, the lamp thus attracting attention at night when the signal blade would not ordinarily be seen. Provision may be made for interrupting the electric circuit for day driving when the lamp is not needed.

In the form of control or operating means shown in Fig. 7 the turning of one of the hand grips 39ᵇ or 40ᵇ by the operator of the vehicle will act through the respective arms and links to either set or retract the signal, according to direction of rotation of the hand grips.

Having thus disclosed my invention, I claim and desire to secure by Letters Patent—

1. In signaling means, a pivoted signaling member comprising two body plates, and a housing at the pivotal point of support of said member; certain opposed parts of said member having a yielding frictional contact with said housing whereby said member may be maintained in either operative or inoperative position.

2. In signaling means, a housing, a pivoted signaling member adapted to be projected from or concealed within said housing, a shaft mounted in the housing and upon which said signaling member is fixed, and means for oscillating said shaft; said signaling member and said housing being inter-related to produce yielding frictional engagement between the same whereby the signaling member may be maintained in position of projection or retraction, said signaling member being formed of spring metal and tending to extend outwardly on opposite sides so as to yieldingly engage opposite sides of said housing, said member being offset for the major portion of its length so as to avoid contact with the housing.

3. A vehicle signaling means, comprising a housing, a signaling member pivoted within the housing and adapted to be projected from or concealed within said housing, said signaling member comprising substantially flat sheets riveted face to face to one another and each provided longitudinally with an outwardly struck concavity and with an opening adjacent to its outer end and in communication with the concavity, said concavities registering to provide a channel to receive means to support illumination, said openings registering with one another, a source of illumination within the openings, and a means to support illumination mounted within the concavities and connected with the source of illumination.

In testimony whereof, I have signed my name to this specification in the presence of two subscribing witnesses.

ALBERT LEE ELIEL.

Witnesses:
 ALFRED H. DAEHLER,
 H. GEARING.